United States Patent [19]

Hackel et al.

[11] Patent Number: 5,189,485
[45] Date of Patent: Feb. 23, 1993

[54] WAVELENGTH METER HAVING SINGLE MODE FIBER OPTICS MULTIPLEXED INPUTS

[75] Inventors: Richard P. Hackel, Livermore; Robert D. Paris, San Ramon; Mark Feldman, Pleasanton, all of Calif.

[73] Assignee: The United States of America as represented by the United States Department of Energy, Washington, D.C.

[21] Appl. No.: 667,471

[22] Filed: Feb. 21, 1991

Related U.S. Application Data

[63] Continuation of Ser. No. 284,859, Dec. 13, 1988, abandoned, which is a continuation of Ser. No. 915,207, Sep. 25, 1986, abandoned.

[51] Int. Cl.$^5$ .............................. G02B 5/14; G01J 3/18
[52] U.S. Cl. ........................ 356/320; 372/32; 359/123; 359/135; 359/138; 385/2; 358/226
[58] Field of Search .............. 359/115, 116, 123, 135, 359/138; 385/2; 356/320; 358/226

[56] References Cited

U.S. PATENT DOCUMENTS

| | | | |
|---|---|---|---|
| 3,811,777 | 5/1974 | Chance | 356/318 |
| 3,967,211 | 6/1976 | Itzkan et al. | 372/32 |
| 4,172,663 | 10/1979 | Byer et al. | 356/352 |
| 4,175,827 | 11/1979 | McMahon | 370/4 |
| 4,182,935 | 1/1980 | Chown | 370/4 |
| 4,340,307 | 7/1982 | Diamond et al. | 356/320 |
| 4,621,282 | 11/1986 | Ahern | 370/4 |
| 4,664,522 | 5/1987 | LeFebre | 356/334 |
| 4,669,878 | 6/1987 | Meier | 356/319 |

FOREIGN PATENT DOCUMENTS 0117118 6/1985 Japan .................................. 356/320

OTHER PUBLICATIONS

Levin et al, "Atomic Uranium . . . for LIS", Jun. 24, 1977, Laser Opto-Elect. Conf., pp. 137-144, Munich, Germany.
Tanaka et al, "Optical Multi/Demultiplexed", Oct. 1981, National Tech. Rept., vol. 27, #5, pp. 735-743.
Avery et al, "Computer-Controlled . . . Spectrophotometer" Aug. 1976, Analy. Chem., vol. 48, #9, pp. 1308-1313.
Nelson et al, "Electro-Optic Multiplexer . . . Fibers", Jul. 1977, Opt. Lett., vol. 1, #1, pp. 35-37.

Primary Examiner—Nelson Moskowitz
Attorney, Agent, or Firm—Miguel A. Valdes; Henry P. Sartorio; William R. Moser

[57] ABSTRACT

A wavelength meter having a single mode fiber optics input is disclosed. The single mode fiber enables a plurality of laser beams to be multiplexed to form a multiplexed input to the wavelength meter. The wavelength meter can provide a determination of the wavelength of any one or all of the plurality of laser beams by suitable processing. Another aspect of the present invention is that one of the laser beams could be a known reference laser having a predetermined wavelength. Hence, the improved wavelength meter can provide an on-line calibration capability with the reference laser input as one of the plurality of laser beams.

5 Claims, 1 Drawing Sheet

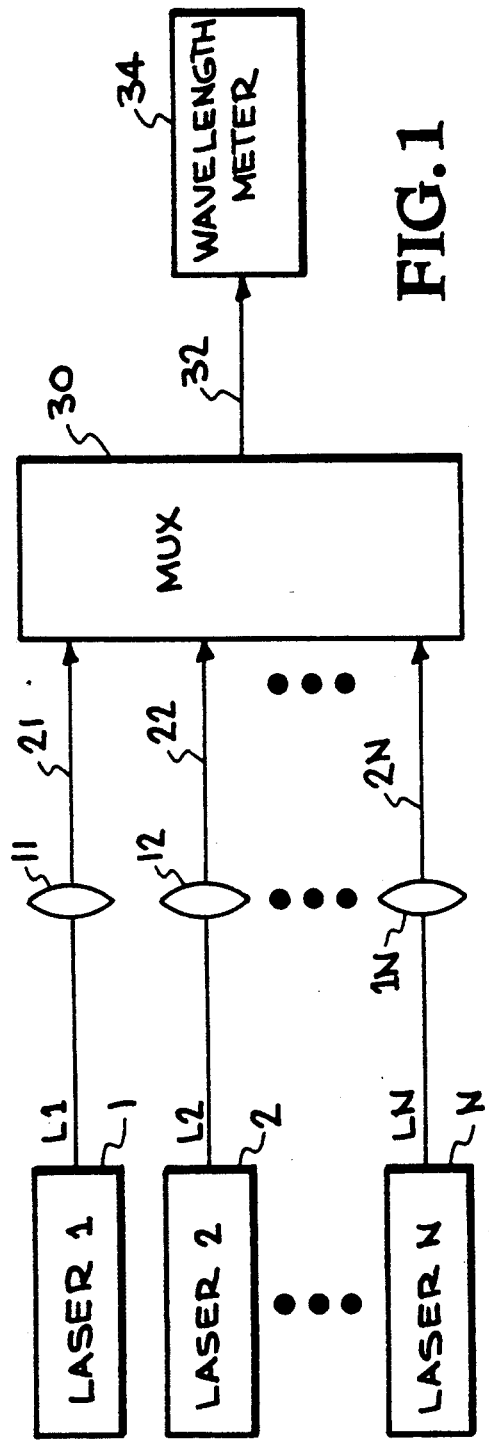
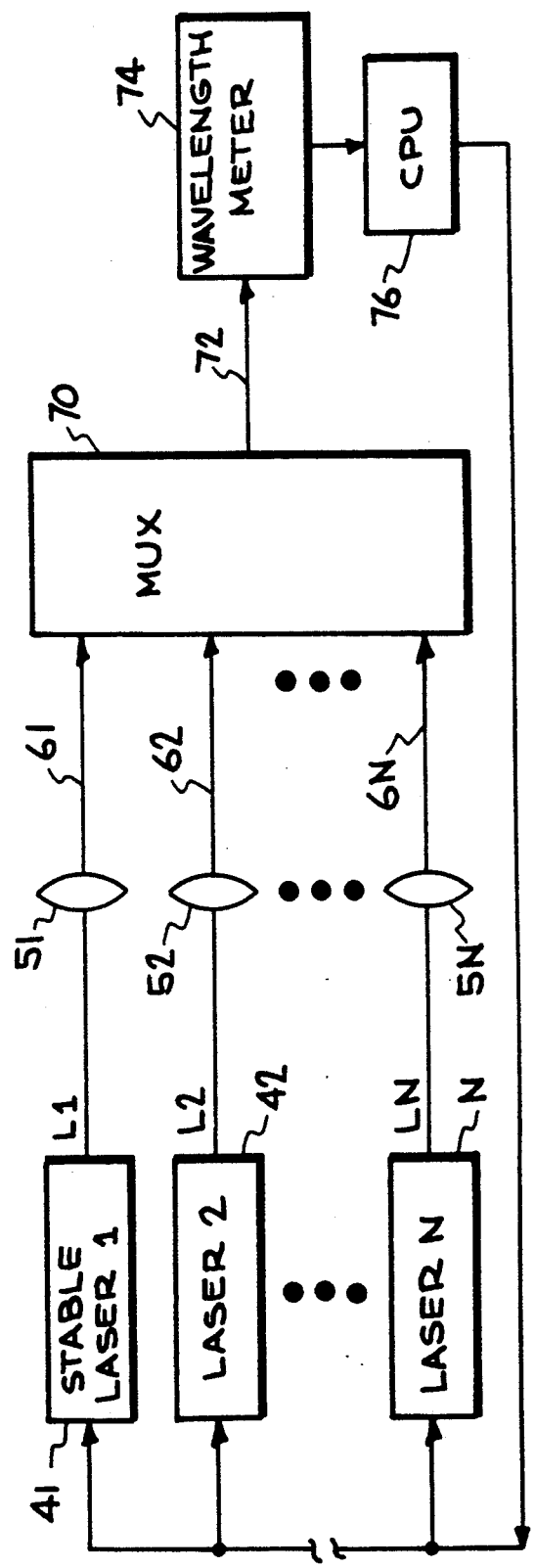
FIG.1
FIG.2

WAVELENGTH METER HAVING SINGLE MODE FIBER OPTICS MULTIPLEXED INPUTS

FIELD OF THE INVENTION

The United States Government has rights in this invention pursuant to Contract No. W-7405-ENG-48 between the United States Department of Energy and the University of California for operation under Lawrence Livermore National Laboratory.

This is a continuation of application Ser. No. 07/284,859 filed Dec. 13, 1988, now abandoned.

Which is a continuation of application Ser. No. 915,207 filed Sep. 25, 1986, now abandoned.

BACKGROUND OF THE INVENTION

The present invention relates to an improved wavelength meter suitable for use in an atomic vapor laser isotope separation (AVLIS) process.

Wavelength meters are known in the prior art for determining the wavelength of light sources, such as monochromatic radiation from a laser source. One well known prior art approach is described in U.S. Pat. No. 4,173,442 issued Nov. 6, 1979 to James J. Snyder for "Apparatus and Method for Determination of Wavelength." In the '442 patent, there is disclosed therein an improved wavelength meter which includes a data processing capability for determining the wavelength of a laser beam.

While that processing capability is suitable for some applications, in general that degree of accuracy may not be suitable for use in an AVLIS process. In an AVLIS process, organic dye lasers are utilized to photoionize an atomic vapor, such as uranium vapor. In such a process, it is necessary to determine the accuracy of the photoionizing laser beams(s) with a very high degree of accuracy, say two parts in $10^8$. The accuracy requirement is the subject of a cross-referenced application entitled "Improved Wavelength Meter Having Elliptical Wedge," Ser. No. 915,200, filed Sep. 25, 1986 the details of which are hereby incorporated by reference.

Another aspect of the AVLIS process is that a plurality of laser sources are required because of the different photoionization levels for the different types of atomic vapor (typically uranium) isotopes. In such an environment, the wavelength of each of the laser sources must be determined with a high degree of accuracy. It would be highly desirable to provide an architecture that could determine wavelength, with the required accuracy, any one of a plurality of laser sources for use in an AVLIS application.

SUMMARY OF THE INVENTION

It is an object of the present invention to provide an improved wavelength meter for use in an atomic vapor laser isotope separation (AVLIS) process.

It is another object of the present invention to provide an improved wavelength meter which can determine with required accuracy the wavelength of any one of a plurality of laser sources as typically used in an AVLIS process.

It is still another object of the present invention to provide an improved wavelength meter which provides with suitable processing techniques an on-line calibration capability for any one of a plurality of laser sources used in the AVLIS process.

In a preferred embodiment, the present invention includes means for transporting a plurality of laser beams, means for multiplexing the plurality of laser beams onto a single mode optical fiber to form multiplexed laser signals, and a wavelength meter means connected to receive the multiplexed laser signals for determining the wavelength of any one or all of the plurality of laser beams.

Another preferred embodiment of the invention includes means for generating a reference laser beam among the plurality of laser beams and further includes means for providing an on-line calibration capability between the reference laser beam and any other of the plurality of laser beams.

Additional objects, advantages and novel features of the present invention will be set forth in part in the description which follows and in part become apparent to those skilled in the art upon examination of the following or may be learned by practice of the invention. The objects and advantages of the invention may be realized and attained by means of the instrumentalities and combinations which are pointed in the appended claims.

BRIEF DESCRIPTION OF THE DRAWINGS

The accompanying drawings, which are incorporated in and form a part of this specification, illustrate a preferred embodiment of the invention and, together with the description, serve to explain the principles of the invention.

FIG. 1 depicts a block diagram of an improved wave meter according to the present invention.

FIG. 2 depicts another preferred embodiment of the present invention which provides an on-line wavelength calibration capability.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Referring now to FIG. 1, a block diagram is depicted of the present invention in which a plurality of laser sources 1, 2, ..., N are illustrated, where each of the lasers 1, 2, ..., N generate laser beams having different wavelengths. A particular laser beam such as from laser 1 might be utilized in an AVLIS process for photoionization of the uranium $U^{235}$ isotope at a particular energy level. Laser 2 might be utilized in a similar AVLIS process for a different energy level of the uranium isotope. Consequently, it can be seen that in an AVLIS process, a plurality of laser beams might be utilized for the different applications.

In FIG. 1, each of the laser beams L1, L2, ..., LN are imaged through respective imaging means 11, 12, ..., 1N to a single mode fiber optic 21, 22, ..., 2N.

The laser beams in the fiber optics are then input to a multiplexer (MUX) 30, which could be a Gould Defense Electronics multiplexer. Multiplexing techniques are well known in the art. The present invention utilizes time division multiplexing techniques (TDM). For example, the laser beams are time division multiplexed by passing one wavelength at a time into MUX 30 using a system of electromechanical shutters S, as depicted in FIG. 1. MUX 30 multiplexes the respective laser beams L1, L2, ..., LN onto a single mode fiber optic 32. The multiplexed laser beams on fiber optic 32 are input to a wavelength meter 34, which processes the respective multiplexed laser beams to determine the wavelength of any one of the laser beams L1, L2, ..., LN. The particular processing details of the wavelength meter 34 are described more completely in the cross-referenced application identified above, the details of which are hereby incorporated by reference. Suffice it to say that wavelength meter 34 can determine with suitable accuracy (i.e., in the range of two parts in $10^8$) the wavelength of any of the laser beams L1, L2, ..., LN.

Another aspect of the present invention is illustrated in FIG. 2 which depicts a variation of the apparatus of FIG. 1. In FIG. 2, a laser such as laser 41 could provide an output laser L1 having a very stable and precise wavelength. Lasers such as laser 41 are known in the art, and could be, for example, a Zeeman stabilized helium-neon laser Spectra Physics Company. According to one aspect of the invention, by providing the known reference laser beam from a laser 41 as part of the plurality of laser beams input to a wavelength meter 74, the present invention can provide an on-line calibration capability.

In FIG. 2, the output of laser 41 is multiplexed in MUX 70 along with the other laser inputs. The multiplexed output of MUX 70 is input to a single mode fiber optic 72 which is input to wavelength meter 74. Because the wavelength meter 74 is provided with a highly stable reference laser beam from laser 41, with suitable processing techniques by a CPU 76, it is possible to provide an on-line wavelength calibration capability. Because the laser 41 of FIG. 2 has a stable output frequency, it is quite possible to provide a wavelength tuning or wavelength control capability for the remaining lasers depicted in FIG. 2 under control of CPU 76. This on-line wavelength calibration capability is a further aspect of the present invention.

The foregoing description of the preferred embodiment of the invention has been presented for purposes of illustration and description. It is not intended to be exhaustive or to limit the invention to the precise form disclosed and many modifications and variations are possible in light of the above teaching.

The preferred embodiment was chosen and described in order to best explain the principles of the invention and its practical applications to thereby enable others skilled in the art to best utilize the invention and various embodiments and with various modifications as are suited to the particular use contemplated. For example, it may be possible to utilize other types of multiplexing techniques other than TDM techniques with the present invention. It is intended that the scope of the invention be defined only by the claims appended hereto.

What is claimed is:

1. The apparatus comprising
    means for transporting a plurality of laser beams,
    optical fiber means wherein said optical fiber means is a single mode optical fiber,
    time division multiplexing means including means for mechanically multiplexing said plurality of laser beams onto said optical fiber means to form a multiplexed laser signal,
    wavelength meter means connected to receive said multiplexed laser beams for determining the wavelength of any one of said plurality of said laser beams.

2. The apparatus as in claim 1 wherein said plurality of laser beams includes a reference laser beam and wherein said wavelength meter means includes means for providing an on-line calibration capability between said reference laser beam and any other of said plurality of laser beams.

3. In an atomic vapor laser isotope separation process, wavelength meter apparatus comprising
    means for transporting a plurality of laser beams,
    a single mode optical fiber,
    time division multiplexing means including means for mechanically multiplexing said plurality of laser beams onto said single mode fiber to form a multiplexed laser signal,
    wavelength meter means connected to receive said multiplexed laser beams for determining the wavelength of any one of said laser beams.

4. The apparatus as in claim 3 wherein said plurality of laser beams includes a reference laser beam and wherein said wavelength meter means includes means for providing an on-line calibration capability between said reference laser beam and any other of said plurality of laser beams.

5. Wavelength apparatus for use in an atomic vapor laser isotope separation process, said apparatus comprising
    means for transporting a plurality of laser beams wherein said plurality of laser beams includes a reference laser beam,
    a single mode optical fiber,
    time division multiplexing means including means for mechanically multiplexing said plurality of laser beams onto said single mode fiber to form a multiplexed laser signal,
    wavelength meter means connected to receive said multiplexed laser beams for determining the wavelength of any one of said plurality of said laser beams, said meter means including means for providing an on-line calibration capability between said reference laser beam and any other of said plurality of laser beams.

* * * * *